Patented Aug. 29, 1944

2,356,896

UNITED STATES PATENT OFFICE 2,356,896

PREPARATION OF POWDERS FROM PLASTIC MATERIALS

Roy E. Smith, Milwaukee, Wis., assignor to Pittsburgh Plate Glass Company, Allegheny County, Pa., a corporation of Pennsylvania No Drawing. Application March 22, 1940, Serial No. 325,403

8 Claims. (Cl. 260—73)

The present invention relates to the preparation of powders of relatively fine particle size from plastic bodies and notably to the preparation of such powders from relatively tough and rubbery plastics which are difficult to comminute by conventional methods of grinding.

One object of the invention is to provide a process of preparing powders of very fine particle size from plastics of the foregoing type, which process does not require mechanical grinding or attrition.

A second object of the invention is to provide a process of preparing fine grained powders from plastic materials by precipitation methods, which process does not require the use of expensive spray apparatus, pressure apparatus or other forms of relatively expensive and specialized equipment.

These and other objects of the invention will be apparent from consideration of the following specification and the appended claims.

There has for sometime been a need for a simple and economical method of preparing relatively fine and uniformly divided powders of plastic materials and particularly of the rubbery or tough and highly extensible plastics, such as vinyl resins, acrylate resins and the like. These powders are susceptible of varied application. For example, layers of them may be interposed in place of preformed sheets, between plates of glass and consolidated by application of heat and pressure to form safety glass. A process of this type is disclosed in Sherts and Dennison Patent No. 2,106,766. Other uses for such powders which suggest themselves involve incorporation into molds for purposes of consolidation under heat and pressure into various objects for which plastics are conveniently employed.

The most obvious method of preparing powder resins of course would involve simple grinding or attrition of the resins upon a conventional mill. However, many of the resins notably of the type of vinyl resins and acrylic resins are so tough and rubbery and also are of such thermoplastic nature that it is impossible to grind them by mechanical attrition to a satisfactory degree of fineness. In fact, in the case of polyvinyl acetal it has been found impossible to grind the resin by mechanical means, even when it has been chilled to a temperature as low as —80° C.

It has also been proposed to form powders of these resins by precipitating them under appropriate conditions from a suitable solvent. Thus in British Patent 498,396, vinyl resin powders suitable for molding were obtained by breaking a solution of the resin into a very fine spray and precipitating while the solution was still finely divided. The resin may be dissolved in an acid solvent and precipitated by a base or may be dissolved in an organic solvent and precipitated in a non-solvent. The limitations of such a process will be obvious; the mechanical difficulties of controlling spray methods except at very high dilution are well known.

Another method is that described in British Patent 481,532, wherein polyvinyl acetals are precipitated in finely divided form. In this method, the resin is dissolved in a water immiscible solvent such as chloroform or methylene chloride. The resulting solution is emulsified under high speed agitation in water in the presence of a dispersing agent such as sodium isobutyl-naphthalene-sulfonate. The solvent is then steam distilled by gently heating the agitated mixture and the product is recovered from the aqueous dispersion.

Still another method is that of German Patent 670,212, wherein polyvinyl compounds are dissolved under pressure in a medium which is liquid under the pressure employed but gaseous at ordinary temperature and pressure. Sulfur dioxide and methyl chloride are suggested for the purpose. The resulting solutions are admixed with a non-solvent held at ordinary temperature and pressure whereby the resin is precipitated in finely divided form.

All of these methods are difficult to control and require especially designed equipment adapted to the problem at hand.

The present invention in its broader aspects involves the discovery that plastic bodies of the foregoing type may be inexpensively and satisfactorily precipitated as very finely divided powders by dissolving the resin in a suitable solvent, adding a small amount of precipitant for the resin, gelling the solution by cooling it while agitating it to effect syneresis and dispersion of the resin from the solvent at a low temperature below that of gelling in the liquid medium.

The method may be described briefly as follows: The resin is dissolved in a solvent at appropriate, e. g. normal, temperatures and a non-solvent is added in quantities just insufficient to bring about precipitation. The resulting solution in this state of incipient precipitation is strongly agitated and is gradually chilled to subnormal temperatures. As the solution cools, it gradually gels and must be strongly agitated to remain homogeneous. The temperature is further reduced whereupon the gel breaks rather rapidly and precipitation of the resin as a very fine suspension occurs. Additional amounts of non-solvent are added at this point to harden the resin and prevent its coalescence when the suspension is allowed to warm to room temperature.

Alternatively the cold resin suspension may be drowned in a large volume of non-solvent under vigorous agitation at room temperature. In either case, the resin may be recovered by filtering and drying under suitable conditions.

It has also been found that similar results can be obtained by cooling a solution of the resin in a solvent to the predetermined temperature of gelation and precipitation and then cautiously adding the required amount of non-solvent at the low temperature. The precipitation and hardening of the product are then effected as described above.

The choice of solvent and non-solvent is made on the basis of the properties of the resin being precipitated. In the interest of economy of materials, it is preferable to select a solvent in which the resin is highly soluble and forms solutions of workable viscosity. In some cases a mixture of two or more solvents may be desirable. A mixture of two or more compounds may be advantageously employed as a non-solvent. In general, the solvent and non-solvent are selected on the basis of small experimental precipitations of samples of the resin under consideration. It will be obvious that the non-solvent must be miscible with the solvent and that it must not soften nor swell the resin at low or normal temperatures.

The resins may be used as pastes or suspensions in the precipitant or may be dried under suitable conditions of pressure and temperature. If the resins are to be dried at elevated temperatures, it is preferable that the non-solvent should have a lower vapor pressure than the solvent. Any solvent remaining in the resin filter cake will otherwise evaporate more slowly than the non-solvent and will soften the resin as the non-solvent is removed. If such a selection is not feasible or is impossible, the solvent should be removed by thorough extraction with non-solvent before drying is attempted.

The solvent and non-solvent may be recovered, if desired, by fractional distillation or other suitable means depending upon the character of the mixture in the mother liquor. After separation and purification they may be used again in the process as described.

When the resin is to be used in the form of a suspension in a non-solvent, the wet filter cake can be dispersed at any desired concentration. Dispersing agents may be employed if desired although it has been found in many cases that none are required.

If the resins are dried, the resulting powders may form coarse lumps but these are easily crushed under light pressure to yield a uniform fluffy powder. In general, 95% or more of the product readily passes a 200 mesh sieve and rough comparisons under the microscope indicate average particle dimensions of less than 1000 mesh.

The following examples will serve to illustrate more completely the nature of the invention:

*Example 1*

About 150 parts of the resin obtained by partial condensation of polyvinyl alcohol with butyraldehyde was dissolved in 850 parts of synthetic methanol. To this solution under agitation at room temperature was added 90 parts of water. The resin was partially precipitated during this addition but redissolved upon continued agitation to form a clear fluid solution. The charge was continuously agitated and was gradually cooled. At 18° C. the charge became translucent and started gelling and at 5° C. the gel was quite heavy and viscous. Very strong agitation was required to keep the solution homogeneous at this point. At −3° C. some syneresis occurred and at −10° C. the gel began breaking and precipitation started. At −20° C. the resin had precipitated and the product was in fluid suspension. It was further cooled to −30° C. and an additional 2000 parts of water was added at this point to harden the resin. The mixture was poured into 3000 parts of water at room temperature and the product was isolated by filtration. It was dried in a current of air at 25° C. to yield a very light fluffy powder, 94.7% of which readily passed a 200 mesh sieve. Under the microscope the particle size appeared to be very uniform and in the neighborhood of 1000 mesh.

The filtered resin may be dried at any temperature below its softening point without serious coalescence of the resultant powder. A temperature of 45–50° C. has been found generally most satisfactory for polyvinyl acetal resins.

*Example 2*

A solution was prepared by dissolving under agitation at room temperature, 100 parts of the resin obtained by copolymerizing, 87 parts of vinyl chloride and 13 parts of vinyl acetate in 900 parts of acetone. To this solution under agitation were added 320 parts of 88% isopropanol. Particles of resin precipitated during this addition but redissolved readily upon continued agitation. There resulted a slightly hazy but very fluid solution which was gradually cooled. At 5° C. the solution had become very hazy and quite viscous. At −4° C. the resin precipitated in very finely divided form to yield a fluid suspension. Cooling to −40° C. brought no further change in the appearance of the suspension.

An additional 700 parts of 88% isopropanol were added at −40° C. and immediately thereafter 1500 parts of water raising the temperature to −24° C. The charge was then dropped into 7000 parts of water at room temperature. After filtering and drying, less than 2% of the powder failed to pass a 200 mesh sieve.

*Example 3*

Fifty parts of a commercial polymerized methacrylic resin known as "Acryloid BC-27" were dissolved in 450 parts of acetone. To this solution under agitation at room temperature were added 75 parts of water. The resulting clear solution was gradually cooled. At 9° C. it was viscous and haziness appeared. At 2° C. it was very hazy and viscous and required strong agitation to keep the mixture homogeneous. Between 0 and −5° C. the viscosity decreased very rapidly indicating that the gel had broken and the resin precipitated. At −8° C. an additional 500 parts of water were added after which the charge was dropped into 6000 parts of water at room temperature.

After mixing 1 hour the resin was filtered and was subsequently dried. It was then obtained as a fine powder the major portion of which readily passed a 200 mesh sieve.

Example 4

A sample of polyvinyl alcohol was prepared by the hydrolysis of low viscosity polyvinyl acetate by the method described by Blaikie and Crozier, J. Ind. and Eng. Chem. 28 1158 (1936). According to this method fifty parts of the polyvinyl acetate known commercially as "Vinylite AYAA" were dissolved in 100 parts of synthetic methanol. A solution of 0.25 parts of caustic potash in 10 parts of methanol was added. After several hours, the solution had set to a gel and after 18 hours a rubbery gel remained covered by a clear mixture of methyl acetate and methanol. The solvent was decanted and the gel was dissolved in water. The resulting solution was held at 90–100° C. until the residual methanol and methyl acetate had been distilled. Additional water was then added so that the final concentration corresponded to the addition of 330 parts of water.

To this solution under agitation was added 330 parts of acetone by volume. It was then chilled gradually to −10° C. where it gelled. At −20°, the gel started synerizing and at −25° the gel was definitely broken and the product had precipitated. At −25 to −30° C. 1000 parts of acetone were added and the resulting suspension was allowed to warm to room temperature and was filtered. The filter cake was washed with 1000 parts of fresh acetone and was then dried in an oven at 65° C.

The product was thus obtained in dry lumps which were readily crushed under light pressure to a fine powder. All but 7% of the product readily passed a 200 mesh sieve.

Example 5

Forty parts of a commercial resin obtained by polymerizing ethyl methacrylate were dissolved in a mixture consisting of 316 parts of 99.5% alcohol and 60% parts of acetone by volume. The solution was agitated at room temperature and there was added a solution consisting of 40 parts of water in 100 parts of alcohol. The solution became slightly cloudy but no precipitation occurred. It was then gradually cooled. At 15° C., the solution had become quite cloudy and at 12° C. it began to gel. At 10° C. the gel started to break and at 5° C. the gel had broken and there was a very fluid suspension. The charge was cooled to −15° C. and was there diluted with 140 parts of water. It was then poured into 2500 parts of water to form a fine suspension.

The suspension was filtered and the cake was washed with water. It was then dried in an oven at 50° C. to form soft lumps which broke readily into a fluffy powder. Essentially all of the powder passed a 200 mesh sieve.

Example 6

Eighty parts of the vinyl chloride-vinyl acetate copolymer known commercially as "Vinylite VYLF" was thoroughly mixed with 120 parts of isopropanol. The resulting mass was dissolved in 200 parts of acetone to form a fluid solution. The solution was gradually cooled to −35° C. at which temperature a slight gelling action was observed. Then under strong efficient agitation there was slowly added 40 parts of isopropanol. This was followed by 40 parts of 90% isopropanol, the addition of which resulted in completing the precipitation.

The resulting suspension was rapidly diluted with 2400 parts of water and the finely-divided resin was filtered and washed with additional amounts of water. After drying at 105° F. the dry resin was readily passed through a 200 mesh sieve.

Example 7

A solution was prepared by dissolving 80 parts of polymerized methyl methacrylate in 633 parts of acetone. The resin dissolved very slowly but yielded a clear homogeneous solution. There was then added at room temperature 214 parts of 50% (by volume) aqueous ethyl alcohol.

The hazy solution was then gradually cooled under continuous strong agitation. At 18° C. there was considerable gelling and some syneresis had occurred. At 13° C., the heavy gel started breaking and the solution started becoming thinner. At 6° C. it was quite fluid. It was rapidly cooled from this point to −15° C. and 270 parts of water were added at −15° C. to −10° C. The cold suspension was rapidly poured into an additional 4300 parts of water under agitation at room temperature.

After filtering and drying at 105° F., the resin was obtained in soft chunks which were readily broken into a powder easily passing a 200 mesh sieve.

Example 8

An intimate mixture of 5 parts of vinyl chloride-vinyl acetate copolymer known commercially as "Vinylite VYHH" and 7.5 parts of titanium dioxide pigment was prepared by thorough mixing on a differential 2 roll mill. This mixture was introduced into 90 parts of acetone under agitation in a jacketed mixer. As soon as the suspension became homogeneous, there was added an additional 17.5 parts of "Vinylite VYHH."

The resin dissolved to form a rather viscous solution in which the pigment was homogeneously suspended. There was then added slowly and under good agitation 29.25 parts of 91% aqueous isopropanol.

The still fluid suspension was gradually cooled under strong agitation until at about 5°–0° C. During this time the suspension gradually thickened as the gel formed and then thinned as precipitation of the resin occurred. An additional 58.5 parts of 91% aqueous isopropanol were added and the cold suspension was then rapidly diluted in 650 parts of water.

After filtering and drying at 100° F. the resin-pigment mixture was obtained as a soft powder readily passing a 200 mesh sieve.

Example 9

One hundred forty parts of the resin obtained by condensing polyvinyl alcohol with butyraldehyde was dissolved to a clear solution in 1860 parts of methanol. The solution was cooled to −15° C. and water was added slowly under strong agitation. When 11 parts of water had been added, heavy gel was formed and after 12 parts, the gel began to break and shortly thereafter a very finely precipitated powder was formed. A total of 2600 parts of water was added at the low temperature, after which the suspension was poured into 18,000 parts of water at room temperature. The resin was filtered and was dried at 36° C. It was thus obtained as a fine powder, at least 97% of which readily passed a 100-mesh screen.

Additional resins that can be precipitated as fine powders by agitating cold solutions in the presence of a precipitant include: ethyl cellulose, cellulose acetate, chlorinated rubber, and the like.

In any of the foregoing examples (1-9) inclusive, the suspensions may be projected as fine sprays into drying chambers where the liquid phase is eliminated by volatilization.

If spray drying is applied, the non-solvent may have the same, or greater or less volatility than the solvents. Spray drying of suspensions without addition of excesses of non-solvent is contemplated. The discrete state of the particles of plastic is maintained during drying by reason of the fact that mixture is suspended in the drying chamber as a spray. It, of course, is necessary to collect the powdery material in a receiver sufficiently cool to obviate coalescence of the particles.

It will be apparent that powdered resins as described in the foregoing examples may include plasticizers and other modifiers which are conventionally employed in such materials. For example, a resin solution, such as described in Example 1, before precipitation may include a modifier such as diethyl phthalate or triglycol dihexoate in amounts for example of 25-40% or other suitable plasticizers.

It is also possible to add a plasticizer to the powder after it has been formed. For example, a suspension of a powder of a partial polyvinyl acetal (e. g. a butyral) in a non-solvent (e. g. water) may be agitated with an emulsion of a plasticizer, in accordance with the method disclosed in Haux Patent 2,046,378.

Pigments, such as $TiO_2$, lithopone, white lead, and the like in appropriate amounts, e. g. amounts of 15 or 50%, for formation of paints and lacquers, may be added to the solutions of resin in Examples 1 to 6, prior to incorporation of the precipitant, to provide a pigmented dispersion that in a non-solvent dispersion medium can be employed for coating purposes. The pigment may also be merely mechanically admixed with the finely-divided resin.

It will be apparent that mixtures of powders may be formed, for example by simple agitation of two distinct powders and these mixtures upon heating under appropriate conditions will fuse or sinter together to provide plastic bodies. It is also possible to mix the powders with pigments and fillers such as powdered asbestos, wood flour, paper pulp, kieselguhr or the like in amounts of 60 or 70%, or thereabouts, to provide molding compositions.

Although only the preferred forms of the invention have been shown and described, it will be apparent to those skilled in the art that numerous modifications have been made therein without departure from the spirit of the invention or the scope of the appended claims.

What I claim is:

1. A process of preparing powders of the resin resulting from condensation of polyvinyl alcohol and butyraldehyde, which comprises dissolving the resin in a solvent, adding a non-solvent thereto in an amount sufficient approximately to effect incipient gelation of the solution, then chilling the solution in order to cause it to gel, agitating the gel with further cooling, to break it up and produce separation of the non-solvent-solvent mixture by syneresis, thus forming a suspension of fine resin particles and while the suspension is still chilled washing out the solvent with non-solvent for the resin.

2. A process of preparing a fine powder from a conjoint polymerization product of vinyl chloride and vinyl acetate, which comprises dissolving the polymerization product in a solvent, adding thereto a non-solvent liquid in an amount sufficient approximately to effect incipient gelation of the resin, chilling the resultant solution to form a gel, then agitating the gel with further cooling to cause separation of the solvent by syneresis and simultaneously to form a suspension of finely-divided resin, then while the suspension is still chilled washing out the solvent with non-solvent for the conjoint polymerization product and drying the resultant powder.

3. A process of preparing powders of ethyl methacrylate resin that will pass a 200 mesh screen, which comprises dissolving the resin in a suitable solvent, then adding a non-solvent liquid in an amount which is approximately sufficient to effect incipient gelation, then chilling the solution to form a gel, then agitating the gel to effect separation of the liquid by syneresis and to precipitate the resin as a finely-divided suspension and subsequently removing the solvent liquids.

4. A process as defined in claim 6 in which the non-solvent has a temperature of volatilization above that of the solvent.

5. A process as defined in claim 6 in which the liquid phase is removed by spray drying.

6. A process of preparing finely divided powders from tough thermoplastic resin, which comprises dissolving the said thermoplastic resin in a liquid solvent, adding a liquid non-solvent diluent to the solution, the non-solvent being miscible with the solvent, in an amount approximately to effect incipient gelation but insufficient to cause substantial permanent precipitation of the plastic at the temperature of addition, chilling the resultant solution to form a gel and to effect syneresis of the formed gel and agitating the gel during syneresis to break it up and to liberate solvent, thus forming a finely divided dispersion of plastic, then while the suspension is still chilled diluting the solvent with additional non-solvent to provide a non-agglomerating dispersion of finely divided material, and removing the mixture of solvent and non-solvent to form a dry powder, most of which will pass a screen of 200 mesh.

7. A process of preparing finely divided resin powders from a soluble organic thermoplastic resin, which comprises dissolving the resin in a solvent therefor, adding a liquid non-solvent for the resin which is miscible with the solvent to the solution in an amount sufficient approximately to effect incipient gelation of the solution, but insufficient to effect substantial permanent precipitation of the resin at the temperature of addition, then chilling the solution until a gel forms and to effect syneresis of the formed gel and agitating the gel with further cooling to break it up and to precipitate the resin as a finely divided dispersion in the solvent-precipitant medium, then while the dispersion is still chilled, adding more solvent to harden the resin, then filtering off and drying the resin.

8. A process of preparing finely-divided powders of the copolymer of vinyl acetate and vinyl chloride, which comprises dissolving the copolymer in acetone, adding isopropanol to the solution to the point of incipient gelation, then chilling and agitating the solution to effect gelation thereof and to break up the gel and effect separation of the liquid by syneresis, subsequently diluting the resultant suspension of finely-divided resin while the suspension is still chilled with additional isopropanol and water, filtering off the finely-divided resin and subsequently drying it to provide a powder most of which will pass a screen of 200 mesh.

ROY E. SMITH.